(12) United States Patent  
Barker et al.

(10) Patent No.: US 7,390,156 B1  
(45) Date of Patent: Jun. 24, 2008

(54) SHEET METAL FASTENERS WITH MULTIPLE SPREADABLE SHANKS

(75) Inventors: John R. Barker, Warren, RI (US); Fredrick S. Hall, Atlantic Beach, FL (US); Michael S. Murphy, Warren, RI (US); David J. Ratcliffe, Warren, RI (US)

(73) Assignee: ES Products, Bristol, RI (US)

( * ) Notice: Subject to any disclaimer, the term of this patent is extended or adjusted under 35 U.S.C. 154(b) by 0 days.

(21) Appl. No.: 11/365,826

(22) Filed: Mar. 2, 2006

(51) Int. Cl.  
*F15B 15/04* (2006.01)

(52) U.S. Cl. ........................ 411/461; 411/479

(58) Field of Classification Search ......... 411/461–465, 411/477–479, 446–448  
See application file for complete search history.

(56) References Cited

U.S. PATENT DOCUMENTS

| | | | | |
|---|---|---|---|---|
| 800,243 A | * | 9/1905 | Popple | 217/70 |
| 1,102,871 A | * | 7/1914 | Carroll | 52/549 |
| 2,533,786 A | * | 12/1950 | Gagnier | 52/511 |
| 3,261,137 A | * | 7/1966 | Jureit | 52/489.2 |
| 4,031,802 A | * | 6/1977 | Hallock | 411/461 |
| 6,126,372 A | * | 10/2000 | Takata | 411/513 |
| 6,764,260 B1 | * | 7/2004 | Nebesnak et al. | 411/82 |

* cited by examiner

*Primary Examiner*—Flemming Saether  
(74) *Attorney, Agent, or Firm*—Dowell & Dowell, PC

(57) ABSTRACT

A sheet metal fastener for securing a covering member to a cementitious-like base or insulating material wherein the fastener includes at least two hollow shanks that depend from a common head and wherein each shank includes opposing generally U-shaped spreadable legs for trapping plugs of the material there between and wherein side walls of the legs also flare laterally away from one another to grasp an additional plug of the material between adjacent shanks as the fastener is driven into the base or insulating material.

8 Claims, 3 Drawing Sheets

SHEET METAL FASTENERS WITH MULTIPLE SPREADABLE SHANKS

BACKGROUND OF THE INVENTION

1. Field of the Invention

This invention is generally directed to fasteners having opposing and spreadable shank portions that diverge outwardly relative to one another in order to trap a plug of material there between as the fasteners are driven into a base material. More specifically, the invention is directed to such fasteners that are particularly well suited for use to securing roofing felts, insulations and membranes to cementitious and/or composite materials.

2. Brief Description of the Related Art

In the commercial roofing industry, cast in-place roofing decks are formed using gypsum, light weight concrete, Zonolite®, perlite, vermiculite and other cementitious materials. After being poured, such materials are sealed against the weather by covering with felts, plastics and other types of membranes that are secured using various types of fasteners. The fasteners are thereafter covered with asphalt, adhesive or other plastic sealants, often followed by additional layers of membrane, thereby forming a waterproof assembly.

In U.S. Pat. No. 3,710,672 to Hallock an early form of spreadable fastener is disclosed having particular utility for securing roofing felt or roofing papers to poured lightweight materials such as insulating concrete used in the roofing industry. The fastener included a pair of legs or shank segments that spread apart when driven into cementitious material to thereby trap a plug of the poured lightweight material there between. The plug of material serves as an anchor to retain the fastener locked to the roof deck. An improvement on this patent was issued as U.S. Pat. No. 4,032,802, also to Hallock. The improved fastener provided beveled cutting edges along the penetrating tip of the spreadable legs or shank segments for the purpose of permitting the fastener to easily and cleanly penetrate roofing felts, papers, plastics or other membranes without tearing or ripping the membranes which would result in failure of the integrity of the seal provided by the membrane system.

One of the major problems associated with cementitious roofing systems is that the sealing membranes can be damaged under high wind conditions such as encountered during hurricanes and tornadoes. Pressure changes across the surface of the sealing membranes can create uplifting forces that can pull anchoring fasteners from the cementitious material or rip the membranes around the heads of the fasteners used to secure the membranes in place.

In view of the foregoing, there is a need to provide fasteners for poured roof deck systems that provide not only an increased resistance to withdrawal forces but also increase the surface engagement with the sealing membranes to thereby reduce the possibility of membrane tearing about the head of a fastener.

SUMMARY OF THE INVENTION

The present invention is directed to a sheet metal fastener having an enlarged head portion from which extend two or more hollow shanks wherein each shank includes a pair of opposing legs that are generally unshaped in cross section. The legs are constructed to interfit in opposing relationship with one another to define a hollow volume or space there between. The legs are pivotally movable relative to the head such that, as the fastener is driven into cementitious material, the legs spread apart to thereby trap a plug of the cementitious material there between. Further, as the legs penetrate the cementitious material, opposing side walls of the legs of adjacent shanks bulge laterally outwardly such that a side wall of one leg extends toward a side wall of a leg of an adjacent shank so that the distance between adjacent shanks is reduced. This bulging of the side walls of the legs of the adjacent shanks not only compacts the cementitious material between the adjacent shanks but also grasps an additional plug of material between the shanks. This grasping of an additional plug of material functions to increase the overall holding capacity of the fastener when compared to prior art fasteners having single shank spreadable legs.

The opposing end wall portions of each of the legs are slightly convexly curved along their inner surface to thereby promote deflection and spreading of the legs relative to one another as the shanks penetrate a cementitious material. The lower edges of each wall of the legs are beveled or tapered to facilitate cutting through and penetrating a membrane through which the fastener is driven.

The enlarged heads of the fasteners of the present invention may also be provided with reinforcing ribs which resist any bending of the heads by forces which tend to lift a secured membrane relative to the head brought about by severe climatic conditions. Further, the provision of a single head for driving two spaced shanks is advantageous because the number of force imparting impacts that are necessary to secure a membrane to a newly poured cementitious substrate is effectively reduced.

It is the primary object of the present invention to provide a new and improved sheet metal fastener for use in securing papers, felts, plastics and other roofing membranes to poured cementitious roof decking materials wherein the fastener resistance to failure or separation from the decking material is increased by providing multiple shanks each having opposing spreadable legs that extend from a common driving head and wherein the resistance to failure is created not only by each shank having unshaped legs for trapping or grasping material plugs there between but wherein an additional plug of material is also grasped laterally between adjacent shanks.

It is a further object of the present invention to provide sheet metal fasteners for cementitious material roofing deck systems wherein the resistance to membrane tearing is enhanced over prior art fasteners by effectively increasing the area of contact between the head of the fastener and the sealing membrane and wherein the head of the fastener may be reinforced to resist bending of the head that can result in fastener failure.

It is another object of the present invention to provide multiple shank fasteners which can be installed more quickly to a roofing deck system as the number of individual fasteners which must be handled for each deck is decreased, thereby not only increasing installation efficiency but potentially saving in labor costs while reducing forceful impacts toward the material substrate.

BRIEF DESCRIPTION OF THE DRAWINGS

A better understanding of the invention will be had with respect to the accompanying drawings wherein.

DESCRIPTION OF THE PREFERRED EMBODIMENTS

Figure 9:
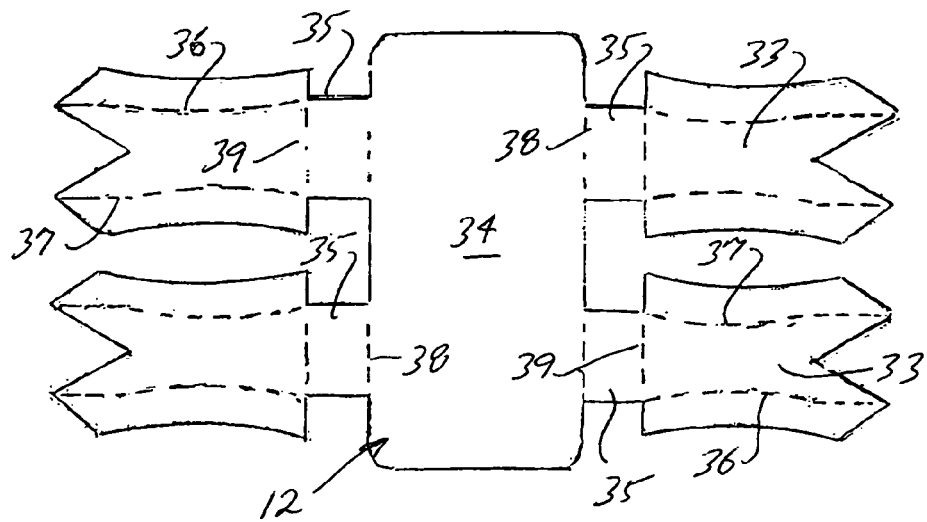
FIG. 9 is a top plan view of a sheet of metal showing the metal being stamped, punched or cut to form a blank from which the embodiment of the invention shown in the drawings may be made.

With continued reference to the drawing figures, a hollow sheet metal nail or fastener 10 is shown that is preferably integrally formed from a single piece or blank of metal 12, see FIG. 9, that has been stamped, punched or cut from a larger sheet of the metal. However, the inventive features of the present invention could also be embodied in a sheet metal fastener form of several blanks that are crimped or otherwise secured to one another.

Figure 1:
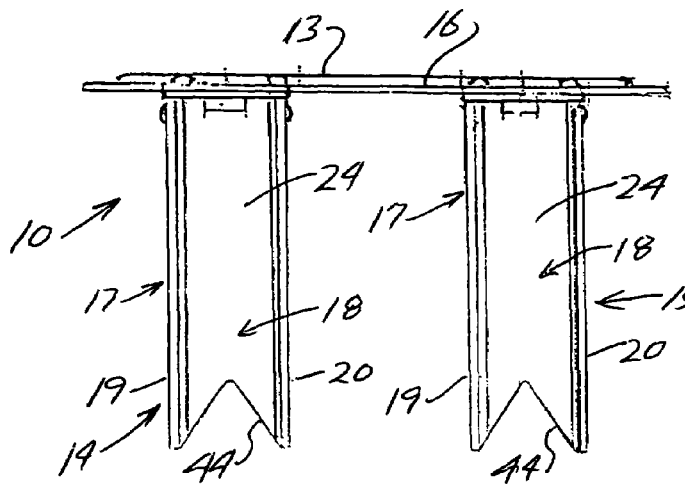
FIG. 1 is a front elevational view of one embodiment of a sheet metal fastener of the present invention.
Figure 2:
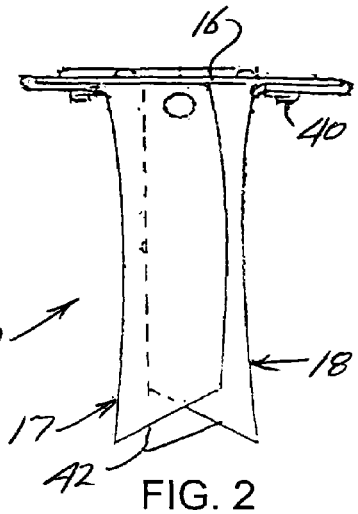
FIG. 2 is a side view of the fastener of FIG. 1.
Figure 3:
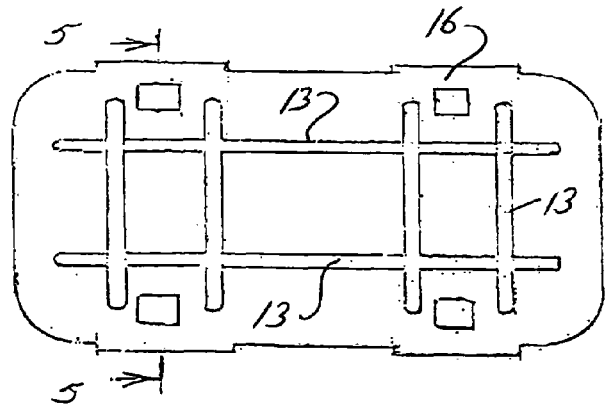
FIG. 3 is a top plan view of the fastener of FIG. 1.
Figure 4:
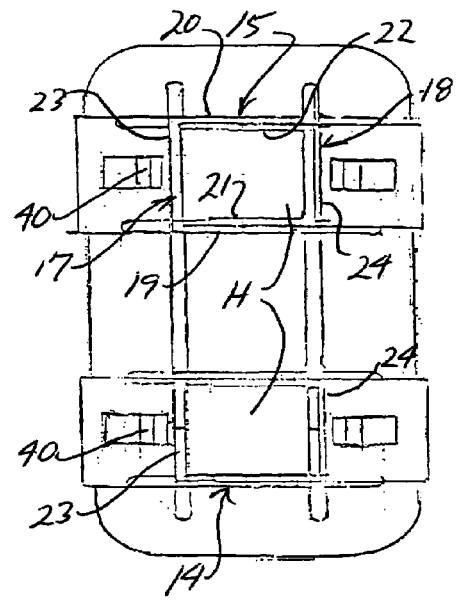
FIG. 4 is a bottom plan view of the fastener of FIG. 1.

The nail or fastener 10 includes at least two hollow shanks 14 and 15 that extend from a common enlarged head 16. The head of the fastener has upper and lower surfaces and is preferably reinforced by a plurality of raised ribs 13 along the upper surface so as to resist bending. The ribs are shown in FIG. 3 as extending across the length and width of the head.

Figure 10:
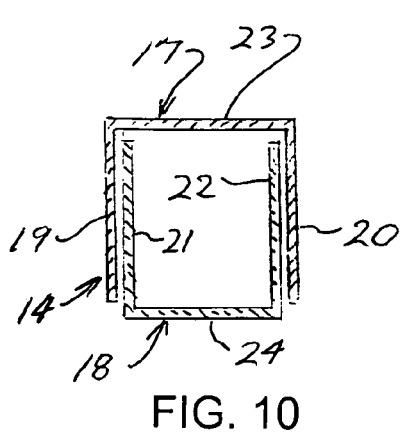
FIG. 10 is a cross sectional view taken along line 10-10 of Fig. showing a configuration of the opposing u-shaped legs of one of the shanks of the fastener of the invention before being driven into a cementitious material.

Each shank 14 and 15 is formed of opposing legs 17 and 18 that are generally unshaped in cross section as shown in the cross section in FIG. 10 which is a cross section of leg 17 before the fastener is driven into a cementitious material. The legs have opposing side walls 19,20 and 21,22, respectively, that are connected by an end wall or web 23,24, respectively. Each end wall 23,24 is preferably formed to promote a relative spreading of the legs when the fastener is driven into a cementitious material. In the embodiment shown, each end wall has an inner surface 26,27 that is convexly arcuately curved so as to facilitate spreading of the opposing legs as the fastener is driven into cementitious material. As manufactured, one leg of each shank seats within the opposing leg such that the side walls of the two legs of each shank are adjacent to one another and thereby define a hollow area "H" there between. In the drawings, legs 18 are shown as being seated within legs 17. As the fastener is driven into cementitious material the opposing legs trap a first material plug "P1" there between that also results in the opposing legs being forced to spread apart relative to one another, see FIG. 7. Because the legs spread apart, and due to the trapped internal plug of cementitious material, a resistance to fastener withdrawal is created.

Figure 11:
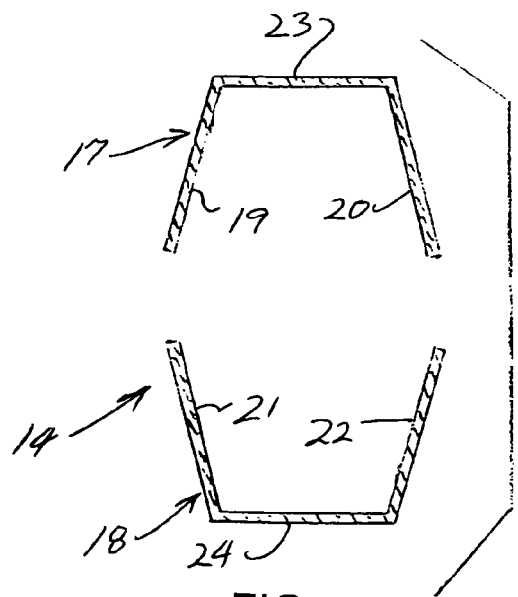
FIG. 11 is a cross sectional view taken along line 11-11 of FIG. 8 showing the lateral spreading of the side walls of the legs of one of the shanks of the fastener of the invention after being driven into cementitious material to thereby grasp a secondary plug of material between adjacent shanks.

A further resistance to fastener withdrawal is created by the structure of the present invention due to an additional compacted plug "P2" of cementitious material that is formed and grasped between the spaced shanks 14 and 15 and beneath the enlarged head 16 as the fastener is driven. As the shanks are driven into the cementitious material, the side walls of the legs of the shanks bulge laterally toward the adjacent shank, as shown by the arrows in FIG. 8, under the influence of the first plugs "P1" of material within the hollow shanks. The bulging shank side walls that grasp the additional plug "P2" of material there between provide additional resistance to fastener withdrawal. Therefore, as the shanks penetrate the material, the side walls of each of the legs 17 and 18 will spread or open laterally as shown in FIG. 11 which is a cross section of the leg 17 after the fastener is driven.

Figure 8:
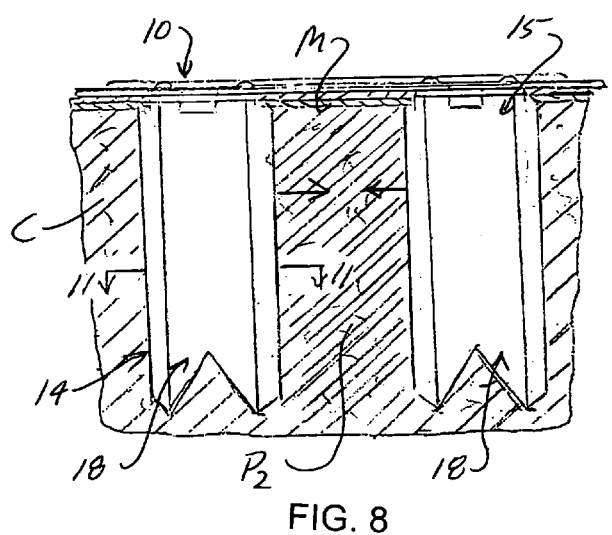
FIG. 8 is a front illustrational view of the fastener of the invention driven into a cementitious roofing deck material showing the further creation of a compressed plug of material that is grasped between bulging side walls of the adjacent shanks of the fastener which additional plug increases the fasteners resistance to withdrawal.

With reference to FIG. 8, the shanks are spaced at a distance relative to one another that is sufficiently close to cause the cementitious material to become compressed there between as the side walls of the opposing legs of each shank laterally expand when the fastener is driven into the material. If the shanks are spaced at too great a distance, little or no effective compression will be created there between. The spacing will depend upon the cross sectional dimensions of the shanks. Thus, with the embodiment shown, resistance to fastener withdrawal is created by the internal material plugs "P1" and spread legs of each shank 14 and 15 of the fastener as well as the plug "P2" of compacted material grasped between the shanks.

Figure 5:
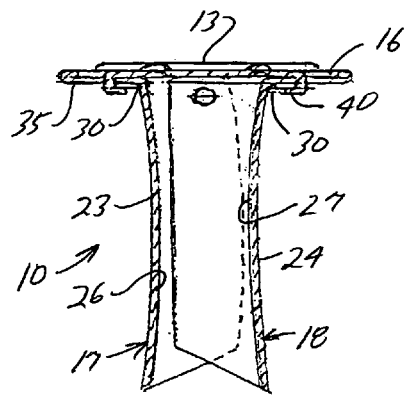
FIG. 5 is a cross sectional view taken along line 5-5 of FIG. 3.

As previously described, the opposing legs of each shank spread relative to one another as the fastener is driven into cementitious material. Such spreading is possible as the end wall of each leg is connected to the head 16 by an integral hinge portion 30, see FIG. 5. During manufacture, and with reference to FIGS. 3, 5 and 9, a sheet metal blank 12 is formed having at least four leg sections 33, a head portion 34 and connected hinge forming portions 35. The legs are created by folding the blank 32 along the dotted lines 36 and 37, shown in FIG. 9, to form the side walls of each leg. Thereafter the hinge forming portions 35 are folded beneath the head along the dotted lines 38 and subsequently folded about the lines 39 so that the legs extend generally perpendicular to the head, as shown in FIG. 5. The hinge forming portions are retained by punching and bending retaining clips 40 from the material from the head portion 34 and bending or folding the clips over the edges of the hinge forming portions 35, also as shown in FIG. 5.

Figure 6:
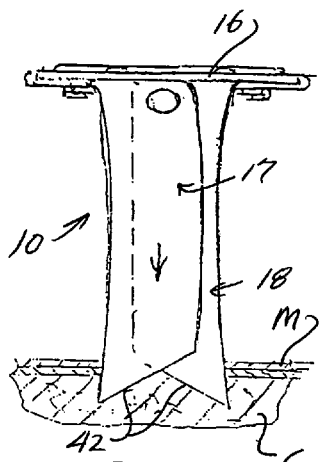
FIG. 6 is a side illustrational view showing the fastener penetrating a membrane being secured to underlying cementitious material.

To facilitate the penetration of the fasteners 10 through a roofing membrane "M", as shown in FIG. 6, without tearing the membrane, the lower edges of the side walls of each leg are beveled or tapered at an angle of between approximately 20° to 45° as shown at 42 in the drawings. Further, the lower edges 44 of the ends walls of each leg are cut or punched to create an inverted "V" structure to facilitate a clean penetration of the end walls through the membrane "M" as the fastener is driven into the cementitious material "C".

Figure 7:
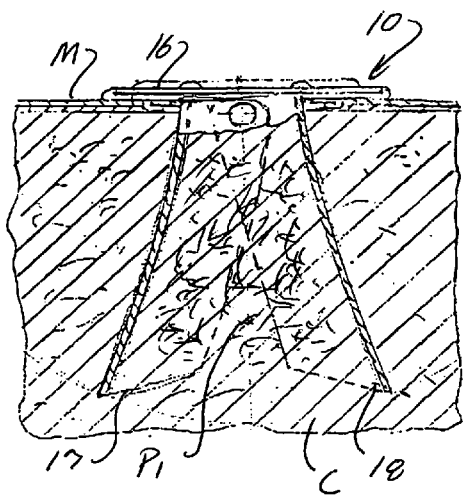
FIG. 7 is a view similar to FIG. 6 showing how each of the shanks of the fasteners of the present invention trap a plug of cementitious material to resist fastener withdrawal.

In the use of the fastener 10 of the invention, the fastener is positioned with lower edges of the shanks 14 and 15 against the membrane "M". Force is thereafter applied to cut through the membrane and drive the fastener into the cementitious material "C" until the head 16 securely engages the membrane as shown in FIG. 7. The cementitious material may be substantially any lightweight insulating base material such as set forth above. As the fastener penetrates the cementitious material, the opposing legs of each shank will spread to capture and grasp the plugs "P1" of material there between while the expansion of the side walls of the legs of adjacent shanks compress and grasp the additional material plug "P2" there between, as shown in FIG. 8. In this manner, the fastener will be securely engaged with the cementitious material with increased resistance to premature or accidental withdrawal, thereby maintaining the integrity of the roof covering materials. As previously noted, in some embodiments, more than two shanks may be associated with the fasteners of the invention.

The foregoing description of the preferred embodiments of the invention has been presented to illustrate the principles of the invention and not to limit the invention to the particular embodiments illustrated and described. It is intended that the scope of the invention be defined by the following claims and their equivalents.

We claim:

1. A sheet metal fastener for securing a covering material to a lightweight insulating base material, the fastener including a head having upper and lower surfaces, at least two hollow shanks extending generally perpendicularly from the lower surface of the head and being in spaced relationship with respect to one another and from the upper surface of the head, each shank including a pair of generally u-shaped legs that are pivotally moveable relative to the lower surface of the head and wherein each leg has opposite side walls which are connected by an end wall, one of the legs being seated within the other leg with the end walls thereof being in opposing relationship to one another to thereby define a hollow space there between, each of the end walls being at least partially configured such that when the fastener is driven into an insulating base material, the opposing legs of each shank will spread apart to receive a first plug of the insulating base material there between such that separate first plugs of the insulating base material are grasped between the opposing legs of each of the at least two hollow shanks to resist fastener withdrawal from the insulating base material, and wherein the at least two hollow shanks are spaced at a predetermined distance relative to one another such that, as the fastener is driven into the base material, adjacent portions of the at least two hollow shanks expand toward one another to thereby grasp a second plug of compressed insulating base material there between when the fastener is driven into the insulating base material.

2. The fastener of claim 1 wherein an inner surface of each end wall is generally convexly curved to promote spreading of the legs of each shank during penetration of the shanks in the insulating base material.

3. The fastener of claim 2 wherein the adjacent portions of the at least two shanks are formed by the opposite side walls of the legs of each shank that laterally expand away from one another when the at least two hollow shanks are driven into the insulating base material to thereby grasp the second plug of the insulating base material between the at least two hollow shanks.

4. The fastener of claim 2 wherein each of the opposite side walls of the legs includes a lower beveled penetrating edge.

5. The fastener of claim 4 wherein each of the end walls of the legs includes a lower beveled penetrating edge.

6. The fastener of claim 5 wherein the lower penetrating edge of the end walls is in a form of an inverted V.

7. The fastener of claim 2 wherein the head is reinforced by integral ribs.

8. A sheet metal fastener for securing a covering material to a lightweight insulating base material, the fastener including a head having upper and lower surfaces, at least two hollow shanks extending generally perpendicularly from the lower surface of the head and being in spaced relationship with respect to one another and from the upper surface of the head, each shank including a pair of generally unshaped legs that are pivotally moveable relative to the lower surface of the head and wherein each leg has opposite side walls which are connected by an end wall, one of the legs being seated within the other leg with the end walls thereof being in opposing relationship to one another to thereby define a hollow space there between, each of the end walls being at least partially configured such that when the fastener is driven into an insulating base material, the opposing legs of each shank will spread apart to receive a first plug of the insulating base material there between such that separate first plugs of the insulating base material are grasped between the opposing legs of each of the at least two hollow shanks to resist fastener withdrawal from the insulating base material, and the shanks being spaced at a predetermined distance relative to one another so that as the fastener is driven into the base material adjacent and opposing side walls of the legs of each shank laterally expand toward one another and thereby grasp a second plug of the insulating base material there between.

\* \* \* \* \*